(12) United States Patent
Lu et al.

(10) Patent No.: US 10,628,423 B2
(45) Date of Patent: Apr. 21, 2020

(54) STREAM PROCESSING IN SEARCH DATA PIPELINES

(71) Applicant: Microsoft Technology Licensing, LLC, Redmond, WA (US)

(72) Inventors: Wei Lu, Bellevue, WA (US); Michael Kinoti, Seattle, WA (US); Shengquan Yan, Issaquah, WA (US); Peng Yu, Bellevue, WA (US); Xian Zhang, Bellevue, WA (US); Guixi Zou, Bellevue, WA (US); Yin He, Kirkland, WA (US); Xavier Drudis Rius, Bellevue, WA (US); Miriam Rosenberg, Kirkland, WA (US); Zijian Zheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1049 days.

(21) Appl. No.: 14/612,126

(22) Filed: Feb. 2, 2015

(65) Prior Publication Data
US 2016/0224632 A1 Aug. 4, 2016

(51) Int. Cl.
*G06F 17/00* (2019.01)
*G06F 16/2455* (2019.01)

(52) U.S. Cl.
CPC .............. *G06F 16/24568* (2019.01)

(58) Field of Classification Search
CPC ......... G06F 17/30516; G06F 17/30312; G06F 16/24568
USPC ....................................... 707/769
See application file for complete search history.

(56) References Cited

U.S. PATENT DOCUMENTS

| | | | | |
|---|---|---|---|---|
| 6,477,580 | B1 * | 11/2002 | Bowman-Amuah | ..... G06F 9/54 709/231 |
| 6,571,282 | B1 * | 5/2003 | Bowman-Amuah | ........................ H04L 67/303 709/219 |
| 6,578,068 | B1 * | 6/2003 | Bowman-Amuah | ... G06F 9/465 709/203 |
| 6,606,660 | B1 * | 8/2003 | Bowman-Amuah | ........................ H04L 65/602 709/227 |

(Continued)

OTHER PUBLICATIONS

Ali, et al., "Online Visualization of Geospatial Stream Data using the WorldWide Telescope", In International Conference on Very Large Databases, vol. 4, No. 12, Aug. 2011, 4 pages.

(Continued)

*Primary Examiner* — Jean M Corrielus
(74) *Attorney, Agent, or Firm* — Merchant & Gould P.C.

(57) ABSTRACT

Architecture that decomposes of one or more monolithic data concepts into atomic concepts and related atomic concept dependencies, and provides streaming data processing that processes individual or separate (atomic) data concepts and defined atomic dependencies. The architecture can comprise data-driven data processing that enables the plug-in of new data concepts with minimal effort. Efficient processing of the data concepts is enabled by streaming only required data concepts and corresponding dependencies and enablement of the seamless configuration of data processing between stream processing systems and batch processing systems as a result of data concept decomposition. Incremental and non-incremental metric processing enables real-time access and monitoring of operational parameters and queries.

20 Claims, 9 Drawing Sheets

(56) References Cited

U.S. PATENT DOCUMENTS

| | | | |
|---|---|---|---|
| 6,615,253 B1* | 9/2003 | Bowman-Amuah | G06F 16/9574 709/219 |
| 6,715,145 B1* | 3/2004 | Bowman-Amuah | G06F 8/20 718/100 |
| 7,085,683 B2* | 8/2006 | Anderson | G06F 11/328 345/419 |
| 7,403,959 B2 | 7/2008 | Nishizawa et al. | |
| 7,539,753 B2* | 5/2009 | Amini | G06F 16/24568 709/224 |
| 7,836,356 B2* | 11/2010 | Haas | G06F 11/008 714/47.1 |
| 8,412,733 B1 | 4/2013 | Black | |
| 8,775,344 B2* | 7/2014 | Blount | G06K 9/00496 706/45 |
| 8,856,182 B2* | 10/2014 | Olson | G06F 16/211 707/797 |
| 8,856,313 B2* | 10/2014 | Amini | G06F 11/3072 455/557 |
| 8,978,034 B1* | 3/2015 | Goodson | G06F 17/30466 718/101 |
| 9,798,537 B2* | 10/2017 | Forguson | G06F 8/70 |
| 2003/0191608 A1* | 10/2003 | Anderson | G06F 11/328 702/189 |
| 2004/0059436 A1* | 3/2004 | Anderson | G06F 11/328 700/2 |
| 2004/0215586 A1* | 10/2004 | Koono | G06N 5/00 706/45 |
| 2006/0101030 A1* | 5/2006 | Mogilevsky | G06F 17/2264 |
| 2006/0282474 A1* | 12/2006 | MacKinnon, Jr. | G06F 9/52 |
| 2008/0188987 A1* | 8/2008 | Gu | H04L 12/4641 700/266 |
| 2008/0243451 A1* | 10/2008 | Feblowitz | G06F 17/30516 703/2 |
| 2008/0307104 A1* | 12/2008 | Amini | G06F 16/24568 709/231 |
| 2009/0234187 A1* | 9/2009 | Higuchi | A61B 1/043 600/114 |
| 2009/0271664 A1* | 10/2009 | Haas | G06F 11/008 714/48 |
| 2009/0292818 A1* | 11/2009 | Blount | G06K 9/00496 709/231 |
| 2010/0287204 A1* | 11/2010 | Amini | G06F 11/3072 707/802 |
| 2013/0318031 A1 | 11/2013 | Bawa et al. | |
| 2014/0012877 A1 | 1/2014 | Krishnamurthy et al. | |
| 2014/0351563 A1* | 11/2014 | Vorbach | G06F 9/3885 712/221 |
| 2016/0070832 A1* | 3/2016 | Boahene | G06Q 10/067 703/13 |
| 2016/0098455 A1* | 4/2016 | Curtin | G06F 17/30312 707/738 |
| 2016/0125315 A1* | 5/2016 | Biem | G06N 5/04 706/12 |
| 2016/0210061 A1* | 7/2016 | Soncodi | G06F 3/0605 |
| 2017/0085693 A1* | 3/2017 | Kobayashi | G06Q 10/107 |
| 2018/0191867 A1* | 7/2018 | Siebel | G06Q 10/06 |

OTHER PUBLICATIONS

Garzo, et al., "Real-Time Streaming Mobility Analytics", In IEEE International Conference on Big Data, Oct. 6, 2013, 6 pages.

Ali, et al., "The Extensibility Framework in Microsoft StreamInsight", In IEEE 27th International Conference on Data Engineering, Apr. 11, 2011, 12 pages.

Lin, et al., "Pollux: Towards Scalable Distributed Real-time Search on Microblogs", In Proceedings of the 16th International Conference on Extending Database Technology, Mar. 18, 2013, 12 pages.

"Highly Scalable Blog", Published on: Aug. 20, 2013, Available at: http://highlyscalable.wordpress.com/2013/08/20/in-stream-big-data-processing/.

Ali, et al., "Real-Time Spatio-Temporal Analytics using Microsoft StreamInsight", In Proceedings of 18th ACM SIGSPATIAL International Conference on Advances in Geographic Information Systems, Nov. 2, 2010, pp. 542-543.

Ali, et al., "Spatio-Temporal Stream Processing in Microsoft StreamInsight", In IEEE Data Engineering Bulletin, Jun. 2010, 6 pages.

Krishnan, et al., "A Hitchhiker's Guide to Microsoft Streaminsight Queries", Retrieved from: http://download.microsoft.com/download/8/9/C/89C4DB34-6AB9-4AA2-B2F5-4604C5964585/A%20Hitchhiker_s%20Guide%20to%20StreamInsight%20Queries%20v2.1.pdf, Jun. 12, 2012, 52 Pages.

* cited by examiner

STREAM PROCESSING IN SEARCH DATA PIPELINES

BACKGROUND

Each day there are millions of users using search engines and generating hundreds of terabytes of search logs. However, the ubiquitous batch-processing technologies incur significant latency, which is a performance bottleneck, thereby negatively impacting the user experience, where in the online services business, for example, fast signals and fast decisions are critical to business success.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a stream-based data processing model that can decompose a monolithic unit of data concepts (e.g., metrics) into individual signals (concepts) and then streams the individual data concepts independently. "Monolithic" is intended to mean a single large unit of interworking and interdependent data concepts, and hence, all the concepts are processed as one large unit to output one or more final results, as in batch processing. In other words, the stream-based model processes individual (atomic) data concepts by decomposing the monolithic unit of data concepts into individual ("atomic") concepts with predefined atomic dependencies.

Consumers of specific atomic concepts can then request processing of those atomic concepts without needing to wait for the entire monolithic unit to be reprocessed again to completion to obtain the desired results.

This capability facilitates optimum flexibility in processing data and making decisions quickly, efficiently, and on demand. Efficient processing of the data concepts is enabled by streaming only required data concepts and corresponding dependencies. This further enables the configuration of data processing between stream processing systems and batch processing systems as a result of data concept decomposition. In other words, as a result of the decomposition capability, different processing models can be applied to the individual concepts, wholly or in part. Rather than needing to process the entire monolithic unit as a whole using only a single processing model, some concepts can be streamed while other concepts can be batch processed. Incremental and non-incremental metric processing enables realtime access and monitor of operational parameters and queries.

The architecture can be implemented as a system, comprising: a separation component configured to separate a monolithic data concept into individual concepts and concept dependencies; a selection component configured to select a concept and associated concept dependencies for stream processing; and a stream processing component configured to perform stream processing of the selected individual concept and the associated dependency. The system can further comprise a metric component configured to compute a metric of a data concept during the stream processing, based on availability of the data concept (whether or not the data concept is available in the stream at the time the metric is computed), and store the metric in a storage. From the input, a signal can be available or not available (e.g., a search page can experience a click or no clicks at all). The metric component can be configured to update the metric over time as a new data concept becomes available, configured to compute a partial value of the metric during the stream processing of the data concept and associated concept dependency, and/or configured to access a value of a metric during the stream processing (e.g., wherein the value can be the most recent value of the metric).

When implemented as a method, for example, the architecture can comprise the acts of decomposing a monolithic data concept into individual instances of both concepts and associated concept dependencies; selecting one or more of the instances of both concepts and associated concept dependencies for stream processing; and stream processing the selected instances of the individual concepts and the associated dependencies on demand.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture includes the decomposition of one or more monolithic data concepts (a single, large chunk of data comprising many data concepts) into atomic concepts (individual or separate concepts such as a query) and related atomic concept dependencies (where a dependency is a relationship to another entity, such as another individual concept), and streaming data processing that processes individual or separate (atomic) data concepts and defined atomic dependencies for fast and efficient decision-making A monolithic data concept includes, but is not limited to, a search engine result page (SERP), also referred to as a form of an impression (comprising many concepts, e.g., query, request time, market, vertical, layout (which is also not completely decomposed), data sources, etc.).

Each data concept can be assigned a concept identifier that differentiates it from other atomic concepts. Similarly, each concept dependency can be assigned a dependency identifier that not only distinguishes the dependencies from each other but also relates one or more dependencies to the corresponding data concept.

Additionally, the architecture can comprise data-driven data processing that enables the insertion (or "plug-in") of new data concepts with minimal effort. This means that the processing is completely decoupled from the actual data. The data concepts act as a plug-in. The processing, by default, does nothing. If one data concept is added to the system then only that one data concept is computed, and if adding another concept, then this additional concept is added to the computation, and so on.

Efficient processing of the data concepts is enabled by streaming only data concepts and corresponding dependencies that are required at a point in time, thereby reducing processor load and improving user efficiency at least with respect to observing queried result and interacting thereafter to access other desired information. The architecture also enables the seamless configuration of data processing (and exchange) between stream processing systems and batch processing systems as a result of data concept decomposition.

With respect to metrics and metric enrichment computation, the disclosed architecture enables the incremental computation of one or more metrics (properties of interest in the architecture). Even if data is incomplete at a given time, progress is furthered by enabling computation of partial versions of some metrics and then storing the partial metric versions and associated state in a memory (e.g., a data store, database, etc.). Metrics can be incrementally updated over time from a prior metric value or property as new data becomes available. This process continues via progressive metric enrichments until the final version of the metric can be obtained.

Incremental update (also referred to as metric enrichment can be applied to subsets of the metrics by way of metric enrichers. Only the appropriate (or desired) metrics are computed at a given time based on customer and/or pipeline needs. This functionality provides flexibility since some metrics can be produced in a progressive way while other metrics can be calculated in a non-incremental way. Non-incremental metrics can be computed using the streaming architecture.

At any given time, a user (and/or system) can query and access the value(s) of a subset of the metrics to obtain the latest (most recent) and optimum available metric value for metrics based on the incremental or non-incremental data available.

Additionally, the disclosed architecture can be expanded to process any data concepts and beyond using metrics. This includes, but it is not limited to, any column/member in a schema (e.g., web URLs (uniform resource locators), URIs (uniform resource identifiers, etc.)), metric and randomized testing scorecards (AB testing of two variants A and B), etc. As new or more accurate data becomes available via atomic streaming, the user can retrieve higher fidelity information from the pipeline in question. This eliminates the artificial time restrictions imposed on conventional data pipelines that use various statistical models for early prediction. Accordingly, data delays are greatly reduced or substantially non-existent.

One possible implementation platform is StreamInsight™ by Microsoft Corporation, which is a .NET-based platform for the continuous and incremental processing of unending sequences of such events from multiple sources with near-zero latency. StreamInsight is a temporal query processing engine that enables an application paradigm where a standing query processes moving events over windows of time. An alternative possible implementation utilizes Storm™, an open-source distributed computation framework, to process the large-scale streaming data and realtime computation.

The data-driven execution engine can be realized through a unified execution engine (described below), which analyzes the input and output requirements of the each data concept (e.g., formalized—conforming to a recognized form), uses a mapping layer to connect (map) the data concepts (e.g., metrics) into a dependency graph (a graph that represents the dependencies of objects to each other), and derives a computation path. Thereafter, the unified execution engine computes the columns needed to fulfill the target list. The required columns are then plugged into streaming processing engine to provide atomic streamable metrics and/or data concepts.

With respect to search engines that generate terabytes of data in search logs, conventional batch-processing technologies incur significant latency. The stream-based processing disclosed herein enables low-latency log processing and log querying. For example, in a use scenario where a customer wants to query the top ten queries in the last hour, the stream processing engine takes this realtime query and then filters the necessary information (e.g., timestamp, query, and market, etc.) from the realtime log event stream pushed by the streaming engine and merges the filtered stream into the query result. The query result, which is a stream as well, returns to the customer in a very short time (e.g., minutes).

With respect to the unified execution engine, traditional data concept definition is often ad hoc. The lack of a formalized approach to define and describe the data concepts often introduces difficulty in the ability to re-use and to insert the data concepts into specific pipeline processing. Even in scenarios where the data concepts can be simple or similar, these concepts are not very scalable. With the adoption of more recent operating system search techniques, this becomes even more challenging because of the fast growing number of data concepts and overall data volume to be processed.

The unified execution engine can formalize data concept definitions to a recognized form for processing. The engine is configured in a data-driven approach to compute the computation path by traversing the specific concept dependency graph. The data concept definitions are organized in hierarchical layers (e.g., impression (what the user sees on the SERP), session, and user) which are based on user behavior over time. These hierarchical layers are described below in greater detail, where the impression layer (or data) comprises all the server data and client events associated with a search engine results page (SERP), including search queries and the URLs included in the SERP; advertisement placeholders on a webpage accessed by user, webpages displayed to users; multimedia content accessed by the users; and/or client interactions with webpages, advertisements, or multimedia. The session layer comprises data identified with a session (e.g., a search session), which may comprise one or more impressions.

The unified execution engine can be configured in the data-driven approach so that the engine can analyze the input and output requirements of each data concept, connect the concepts into a dependency graph, and then derive a computation path (e.g., optimal in terms of execution) based on the dependency graph. In other words an interface (contract) is developed to define concepts. Each concept declares what it produces (output) and what it needs as input (other concepts) in order to produce its output. The dependency graph can be built using this information to determine computation paths. Data concept computation is independent of pipeline processing, and thus, can be flexibly configured as pre-computation in the pipeline or on demand.

The data-driven data processing system can be realized by building a common data platform infrastructure that enables the following set of interfaces and an execution engine (that builds the dependency graph between concepts and handles execution): a generic data infrastructure; clear separation between pipeline logic and data logic; a common data logic interface for various data pipelines; generic pipeline logic; and, an entirely configurable pipeline (the data logic acts as plug-in). These capabilities can be exemplified in the unified data processing system 500 of FIG. 5.

With complete separation of pipeline processing logic and data logic, the execution engine can plug-in data logic at any step/layer of the processing pipeline. A choice can be made to pre-compute and store most commonly used data logic and defer less commonly-used data logic to runtime processing, using a configuration update. Data logic is completely pluggable, and even sharable in different data processing pipelines.

As described in greater detail herein, the unified execution engine analyzes the input and output (I/O) requirements of the each data concept, uses a mapping layer to map the I/O into the dependency graph, and derive the computation path. Afterwards, the unified execution engine computes the columns needed to fulfill a target list, and then runs the pipeline logic.

The unified execution engine comprises at least pipeline logic (how to process the data logic), data logic (e.g., business logic) that is being computed, store manager, and an impression, described as the following. The pipeline logic is the processing logic handling the end-to-end data pipeline process, including data extraction, impression/session level merging, partitioning, data issue detection, job scheduling, and view publication. The pipeline logic can be configured to understand only a minimum amount of data concepts which are shared by all datasets, such as impression, session, user, etc. The pipeline logic can be configured to be generally dataset independent, though there can be different configurations for optimization purposes.

The data logic performs the transformation of data concepts utilized for data consumption, including transforming the raw instrumentation data to the consumption data model, the wrapping of commonly used data enrichment, etc. Data logic is generally dataset specific, though some data logic can be shared by multiple datasets. As described herein, the data logic can be implemented as an interface referred to as IEnricher.

The store manager performs data serialization (data conversion from memory for persistent storage on a given system/device) and deserialization (the reconstruction of a data structure from the storage system/device) with different physical storage units or instances. A store manager interface ("IStoreManager") provides an abstraction for differences in file format and storage APIs (application program interfaces). The impression (I Impression) is a dataset independent and file-format independent representation of all the data for one page view, including raw instrumentation data and enriched processed data. Raw data can be used to represent the events obtained from an application (e.g., input signals logged by an application). The raw data is then processed ("cooked") by doing things such as cleaning (e.g., deduplication, bot detection), enrichment (e.g., calculating the data logic/concepts) and then persisted to a permanent storage by serialization.

The disclosed architecture exhibits technical effects of reduced processor load since the entire monolithic unit does not need to be processed for the desired results, but only specific atomic concepts. As a consequence, less memory space is needed, and fewer processor cycles are utilized. Additionally, in a distributed implementation, network traffic is reduced as well since only one or a few atomic concepts are processed rather than the entire monolithic unit, and fewer servers are required since again, the entire monolithic block does not need to be processed for a small number of desired results at the output.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
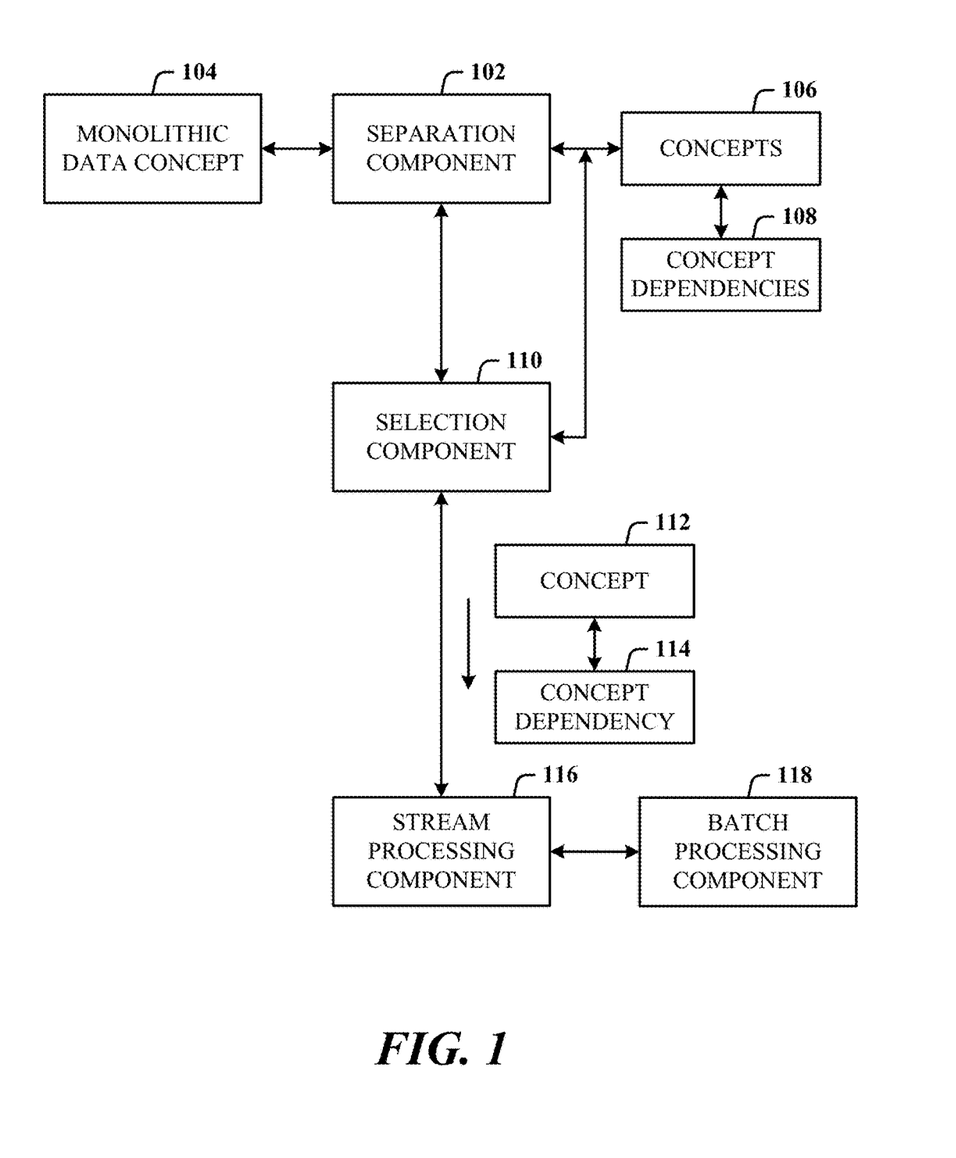
FIG. 1 illustrates a system of stream processing in a search data pipeline in accordance with the disclosed architecture.

FIG. 1 illustrates a system 100 of stream processing in a data pipeline (e.g., search) in accordance with the disclosed architecture. The system 100 can include a separation component 102 configured to separate a monolithic data concept 104 into individual concepts 106 and generate concept dependencies 108 for the individual concepts. The separation component 102 operates to control data by separating the monolithic data concept 104 into atomic concepts (concepts 106) and related atomic dependencies (concept dependencies 108).

A selection component 110 can be provided and configured to select an individual concept 112 (of the concepts 106) and associated concept dependency 114 (of the concept dependencies 108) for stream processing. Selecting not necessarily all, but only a subset (less than all) of the concepts 106, enables improved computing operations speed and thereby improved user efficiency because of the reduce latency in observing operational parameters and system monitoring. However, it is to be appreciated that selection can be made of all the concepts 106 and associated concept dependencies 108. Additionally, where a subset selection is made, this has the effect of reduced network bandwidth usage, since not all of the concept data is being transmitted, and furthermore, reduced processor load, since concepts and dependency processing is more abbreviated than with processing the entire monolithic data concept 104 for each query (user generated and/or system generated).

A stream processing component 116 is provided and configured to perform stream processing of the selected individual concept 112 and the associated dependency 114. Stream processing enables the processing in parallel of the now separate channels (also referred to as pipelines or data signals) of the concepts and associated dependencies, rather than of the entire monolithic data concept 104, thereby having the effect of improved efficiency of the data driven data processing requirements for at least on-demand requests to queries.

Although described as selecting and stream processing an individual concept 112 and concept dependency 114, it is to be understood that multiple concepts and associated concept dependencies can be selected and communicated in parallel to the stream processing component 116 and then processed concurrently through the stream processing component 116. Additionally, the concept 112 may have more than one dependency 114.

The stream processing component 116 can be configured to stream process the selected individual concept 112 and the associated dependency 114 as part of data-driven data processing (computations or executions are performed in an order dictated by data dependencies). In other words, the selection and stream processing can be on demand. The selection component 110 can be configured to select only a specific individual concept (e.g., concept 112) and an associated dependency (e.g., dependency 114) or dependencies for a data driven requirement. The stream processing component 116 can be configured to enable communication with a batch processing component 118 to communicate the concept 112 and associated concept dependency 114.

Figure 2:
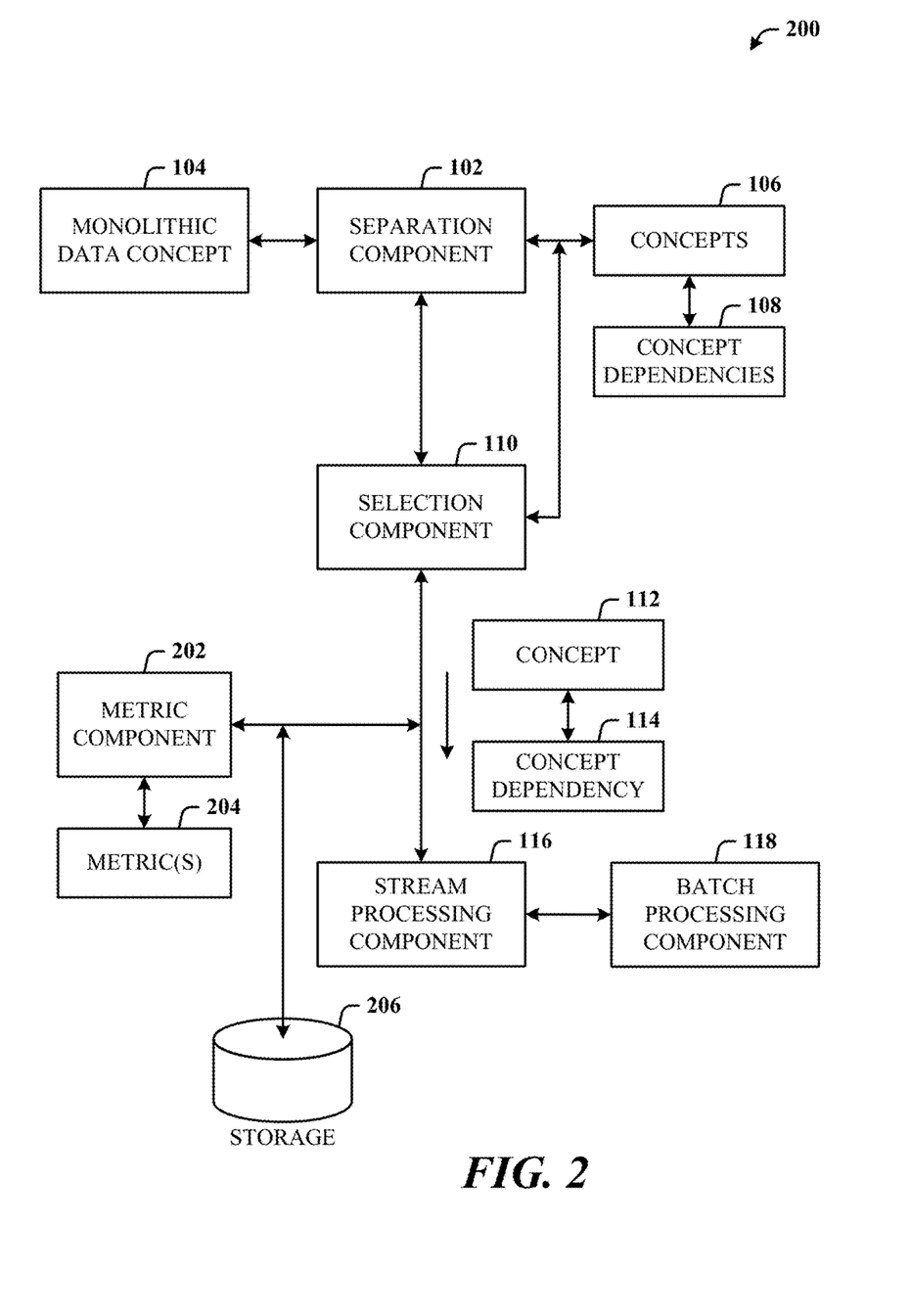
FIG. 2 illustrates an alternative system of stream processing in a search data pipeline in accordance with the disclosed architecture.

FIG. 2 illustrates an alternative system 200 of stream processing in a search data pipeline in accordance with the disclosed architecture. The system 200 comprises the system 100, with the addition of a metric component 202. The metric component 202 can be configured to compute a metric (of one or metrics 204) of a data concept (e.g., concept 112) during the stream processing, based on availability of the data concept, and store the metric in a storage 206.

The metric component 202 is configured to update the metric over time as a new data concept becomes available. The metric component 202 is configured to compute a partial value of the metric during the stream processing of the data concept and associated dependency. The metric component 202 is configured to access a value of a metric during the stream processing. The value is a latest value of the metric.

It is to be understood that in the disclosed architecture, certain components may be rearranged, combined, omitted, and additional components may be included. For example, in FIG. 1, the selection component 110 can be implemented as part of the separation component 102, or implemented as part of the stream processing component 116. In another example, in FIG. 2, the metric component 202 can be implemented as part of the stream processing component 116. Additionally, in some implementations, all or some of the components are present on the client, while in other implementations some components may reside on a server or are provided by a local or remote service.

Figure 3:
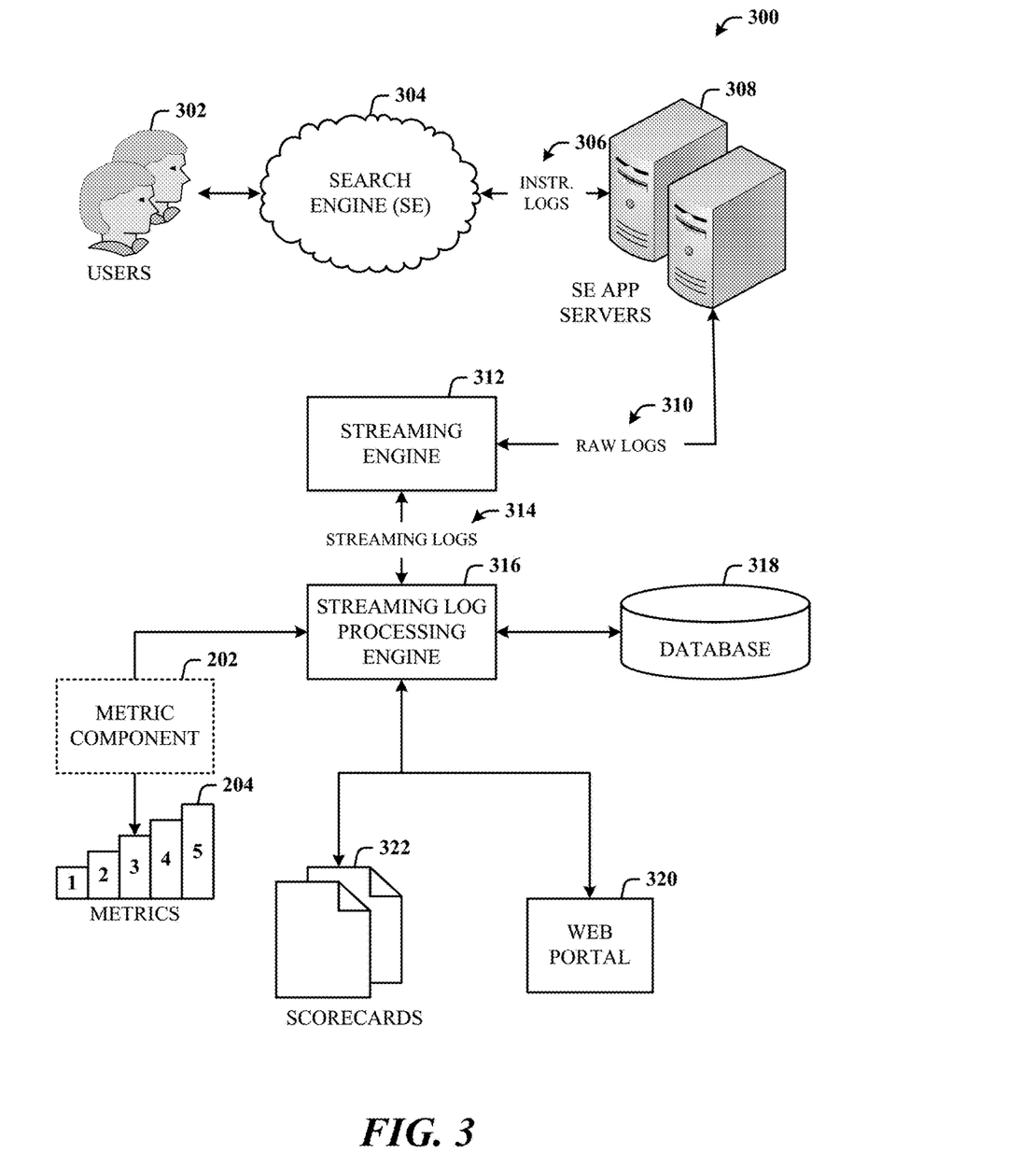
FIG. 3 illustrates a system for decomposition of a monolithic data concept into concepts and concept dependencies for stream processing in accordance with the disclosed architecture.

FIG. 3 illustrates a system 300 for decomposition of a monolithic data concept (e.g., monolithic data concept 104) into concepts and concept dependencies for stream processing in accordance with the disclosed architecture. In the system 300, users 302 interact with a search engine (SE) 304, from which instrumentation (INSTR.) logs 306 are communicated to search engine application servers 308. The application servers 308 send raw logs 310 (similar to the monolithic data concept 104 of FIG. 1) to a streaming engine 312. The streaming engine 312 (similar to the separation component 102 of FIG. 1) outputs the logs received as input from the application servers 308, as streaming logs 314.

A streaming log processing engine 316 (similar to the stream processing component 116 of FIG. 1), receives and processes the streaming logs 314. Metrics 204, by way of the metric component 202 (external from or internal to the streaming log processing engine 316), are computed and accessed for the streaming log processing engine 316, and can also be stored in the database 318 (similar to the storage 206 of FIG. 2). In one implementation, the database 318 can be an OLAP (online analytical processing) database suitable for fast data access and processing.

The system 300 can be monitored (e.g., by a user and/or other system) via a web portal 320 and using scorecards 322 to continually assess the performance of the system 300 and the desired parameters, such as one or more of the metrics 204.

As visually indicated, the metrics 204 can be computed incrementally as the system 300 stream processes the streaming logs 314. A single metric can be computed and accessed multiple times as the stream processing progresses. Here, a single metric is shown to be computed and evolving over five different points in time. Alternatively or in combination therewith, five different metrics can be computed at the same time or at differing points in time of the stream processing.

Figure 4:
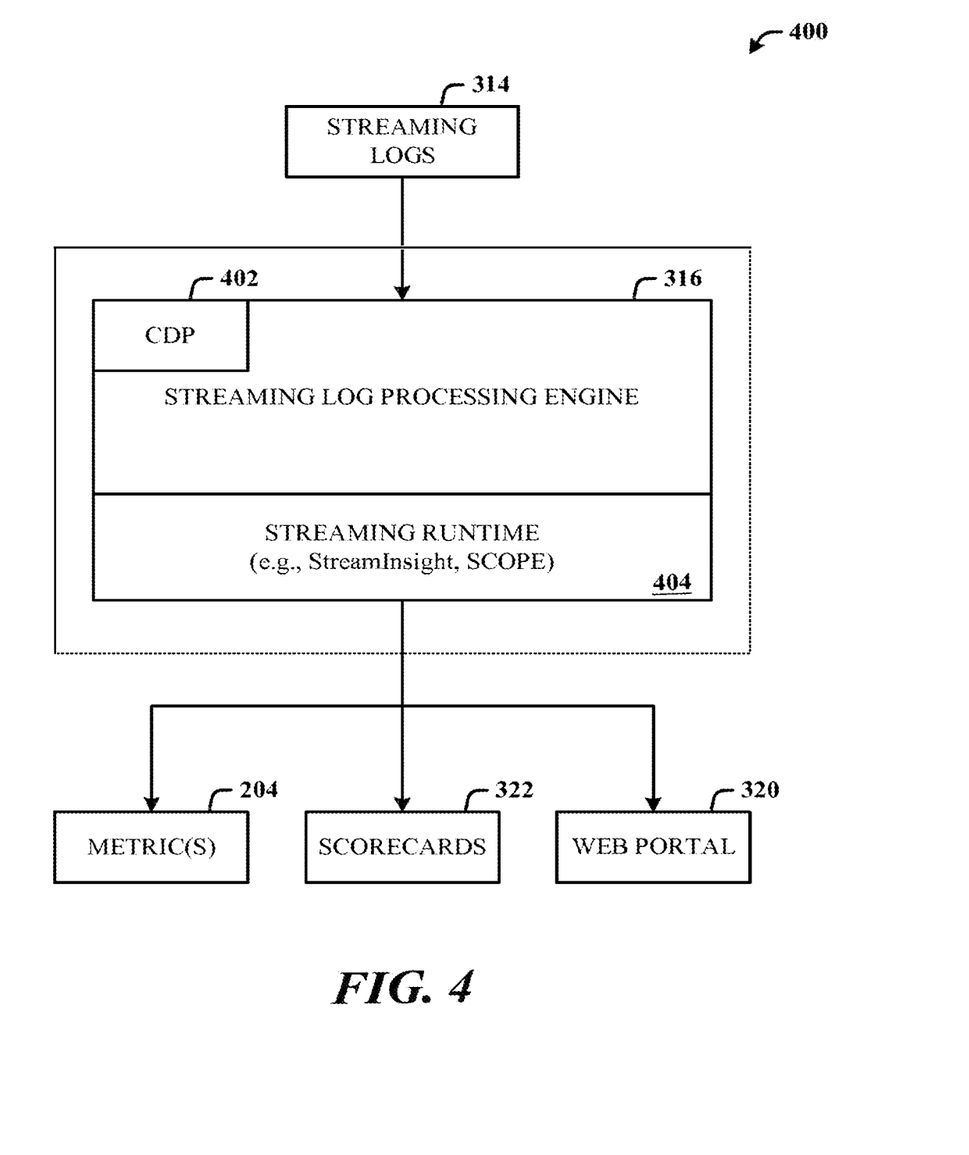
FIG. 4 illustrates a block diagram of a common data platform implementation of the unified data processing system in accordance with the disclosed architecture.

FIG. 4 illustrates a block diagram of a common data platform implementation of the unified data processing system 400 in accordance with the disclosed architecture. Although not depicted, the common data platform 402 can comprise data processors that perform different functions, where the data processors are serially connected, generally, and each data processor reads the signals (e.g., metrics) from the previous processor and generates one or more new signals for the following processor. The streaming log processing engine 316 interfaces to a streaming runtime 404 (e.g., StreamInsight, SCOPE, etc.). As previously described, outputs of the streaming log processing engine 316 can include, at least, the metrics 204, scorecards, 322, and web portal(s) 320.

Figure 5:
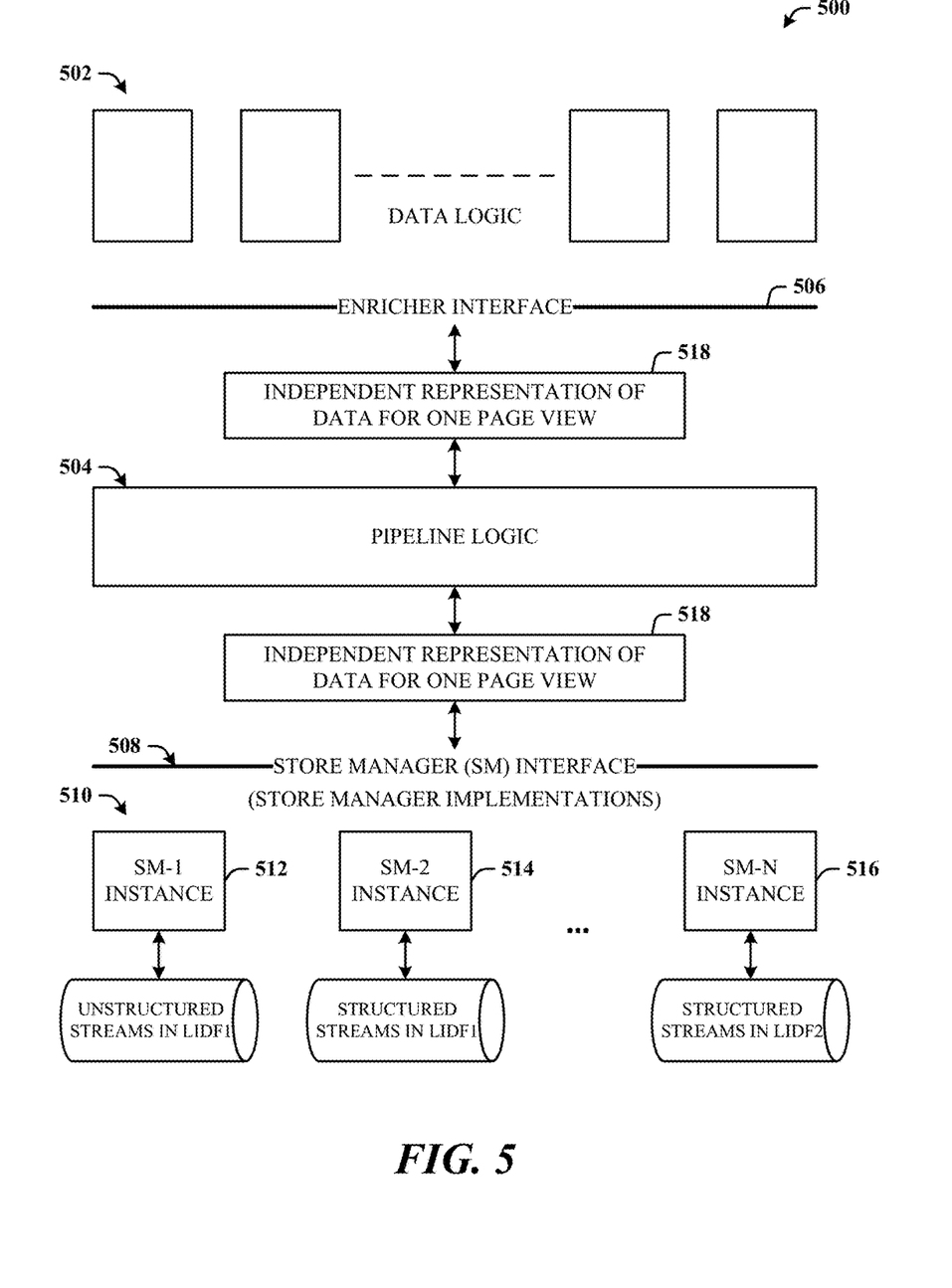
FIG. 5 illustrates an exemplary unified data processing system implemented as a common data platform and showing separation of data logic and pipeline logic in accordance with the disclosed architecture.

FIG. 5 illustrates an exemplary unified data processing system 500 implemented as a common data platform and showing separation of data logic 502 and pipeline logic 504 in accordance with the disclosed architecture. The common data platform interfaces to a data store (storage) to provide data services accessible by a plurality of disparate application frameworks, which data services allow a corresponding application of the different frameworks to access the data store.

The data logic 502 facilitates the transformation of data concepts used for data consumption, including transforming the raw instrumentation data (e.g., raw logs 310 of FIG. 3) to the consumption data model, wrapping of common used data enrichment, etc. The data logic 502 is generally dataset specific, though some data logic 502 can be shared by multiple datasets. Data logic 502 can be implemented as an enricher interface 506 (referred to in code herein as IEnricher).

The pipeline logic 504 is the processing logic that handles the end-to-end data pipeline process, including but not limited to, data extraction, impression/session level merging, partitioning, data issue detection, job scheduling, and view publication. The pipeline logic 504 understands only a minimum amount of the data concepts (e.g., the concepts 106), which are shared by all datasets, such as impression, session, user, etc. The pipeline logic 504 can be generally, dataset independent, although there can be different configurations for optimization.

A store manager (SM) interface 508 facilitates data serialization and deserialization with different physical storage subsystems 510 (denoted as instances SM-1, SM-2, . . . , SM-N). The store manager interface 508 provides an abstraction for differences in file format and storage APIs (application program interfaces). For example, storage manager implementations can include a first storage manager instance 512 that handles unstructured streams in a first lightweight data-interchange format (LDIF) (e.g., JSON—JavaScript™ object notation), a second storage manager instance 514 that handles structured streams in the first LDIF, and an Nth storage manager instance 516 that handles structured streams in a second LDIF (e.g., BSON—a computer data interchange format based on JSON), etc.

Accordingly, the system 500 can process the independent representation of data for one page view 518 (referred to herein as an impression: a dataset-independent and file-format-independent representation of all the data for one page view, including raw instrumentation data (logs) and enriched processed data).

The data concepts (e.g., formalized) can be defined by a list of inputs and outputs and filtering (e.g., customized), as shown below:

```
/// <summary>
/// All data logic is implemented as IEnrichers. One enricher
/// takes multiple input columns (represented by PropertySchema)
/// and produces multiple columns. To call the enricher, the
/// caller (Execution Engine) ensures all the required columns
/// are ready before the enricher is called.
/// </summary>
public interface IEnricher
{
    /// <summary>
    /// Return an enumerable of PropertySchema that this enricher
    /// requires. This is used to figure out enricher
    /// dependencies by the Execution Engine.
    /// </summary>
    /// <returns></returns>
    IEnumerable<PropertySchema> Requires( );
    /// <summary>
    /// The returned PropertySchemas by this enricher.
    /// </summary>
    /// <returns></returns>
    IEnumerable<PropertySchema> Produces( );
    /// <summary>
    /// The Enrich( ) can only see the impressions that make
    /// Filter.FilterFunc(impression) == true; otherwise, the
    /// invoker assigns it a default value.
    /// </summary>
    EnricherFilter Filter { get; }
}
```

Figure 6:
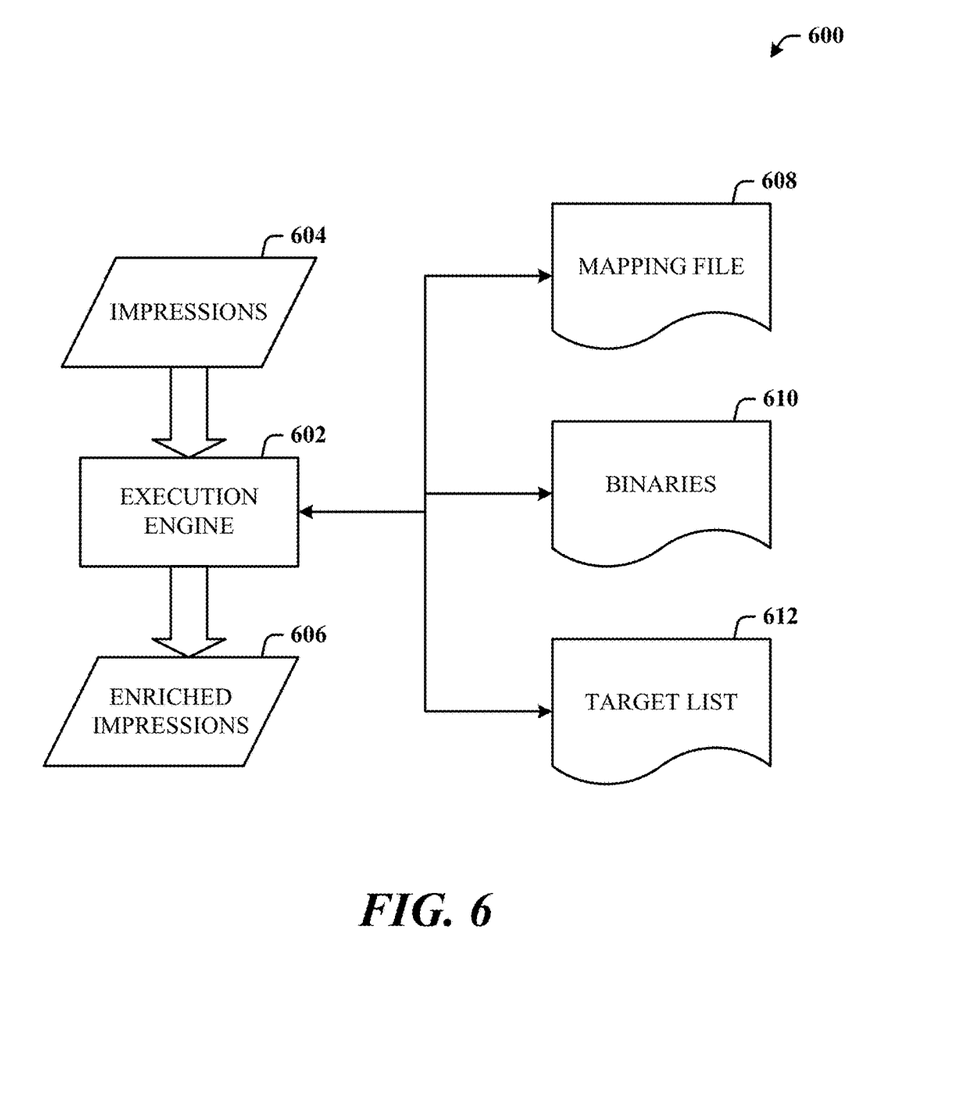
FIG. 6 illustrates an exemplary execution system in accordance with the disclosed architecture.

FIG. 6 illustrates an exemplary execution system 600 in accordance with the disclosed architecture. The system 600 comprises an execution engine 602 (similar to the stream processing component 116 of FIG. 1, the streaming log processing engine 316 of FIG. 3 and FIG. 4, and unified data processing system 500 of FIG. 5) that receives impressions 604 and outputs enriched impressions 606. The execution engine 602 interfaces to a mapping file 608, binaries 610, and a target list 612. The mapping file 608 enables the calling of an enricher to obtain the computed fields. The schema of the enricher output can be declared by an enricher function. Example commented code can be as follows:

```
// Call an enricher to get the computed fields. The schema of
  enricher output is declared by enricher produces function.
    DwellTimeEnricher( )
    MetricsEnricher( )
// Simple Column definition without enrichers.
    ClickCount    Page.Clicks.Count
```

The binaries 610 can also comprise the enrichers. The target list 612 is a list of target columns that are to be computed. Following is an example of commented code for this operation.

```
// A list of target columns to be computed
    ClientId
    ClickCount
    Metrics_A
    DwellTime
```

The disclosed architecture can optionally include a privacy component (not shown) that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
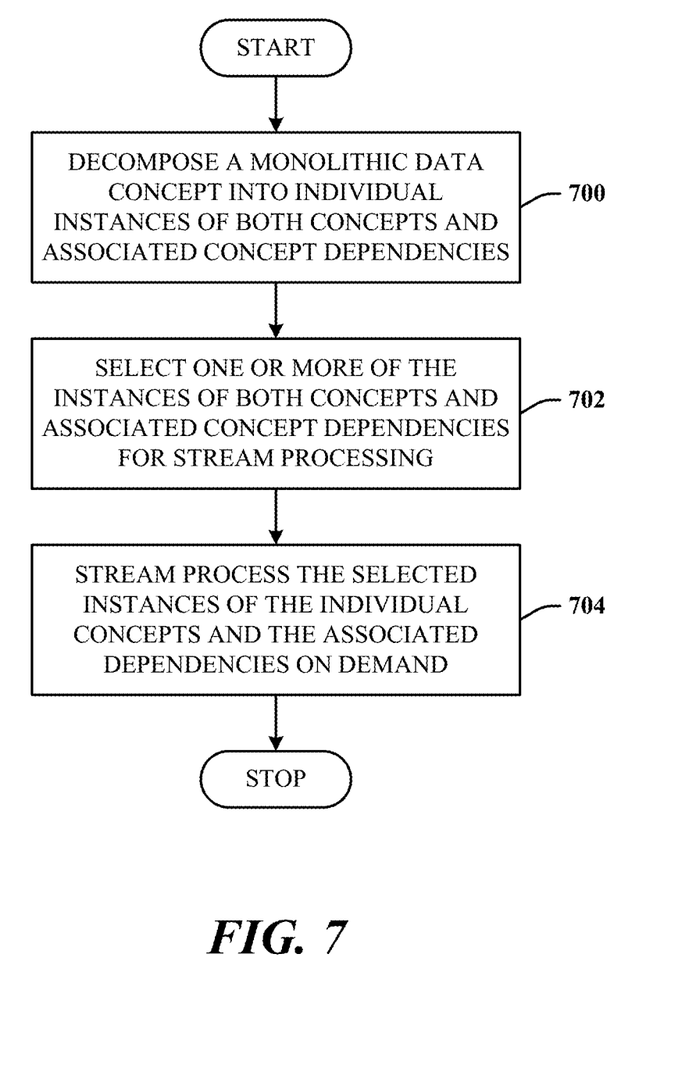
FIG. 7 illustrates a method in accordance with the disclosed architecture.

FIG. 7 illustrates a method in accordance with the disclosed architecture. At 700, a monolithic data concept is decomposed into individual instances of both concepts and associated concept dependencies. At 702, one or more of the instances of both concepts and associated concept dependencies are selected for stream processing. At 704, the selected instances of the individual concepts and the associated dependencies are stream processed, on demand. The acts of decomposing, selecting, and stream processing enable improvements in computing speed, reduced processor load, and operating system resource allocation, thereby further enabling improved user and data consumer efficiencies in at least hand-held device capabilities.

The method can further comprise decomposing the monolithic data as part of a data driven process. The method can further comprise stream processing only a specific individual concept and its associated dependencies for a data driven requirement.

The method can further comprise computing metrics during the stream processing, which metrics represent availability of the data concepts, and storing the metrics in a storage. The method can further comprise updating the metrics over time as new data concepts become available. The method can further comprise computing a partial value of a metric during the stream processing of the data concepts and associated dependencies.

The method can further comprise accessing a value of a subset of the metrics during the stream processing to obtain a latest value of the subset of metrics. The method can further comprise interfacing the stream processing to batch processing based on the individual instances of both concepts and associated concept dependencies.

Figure 8:
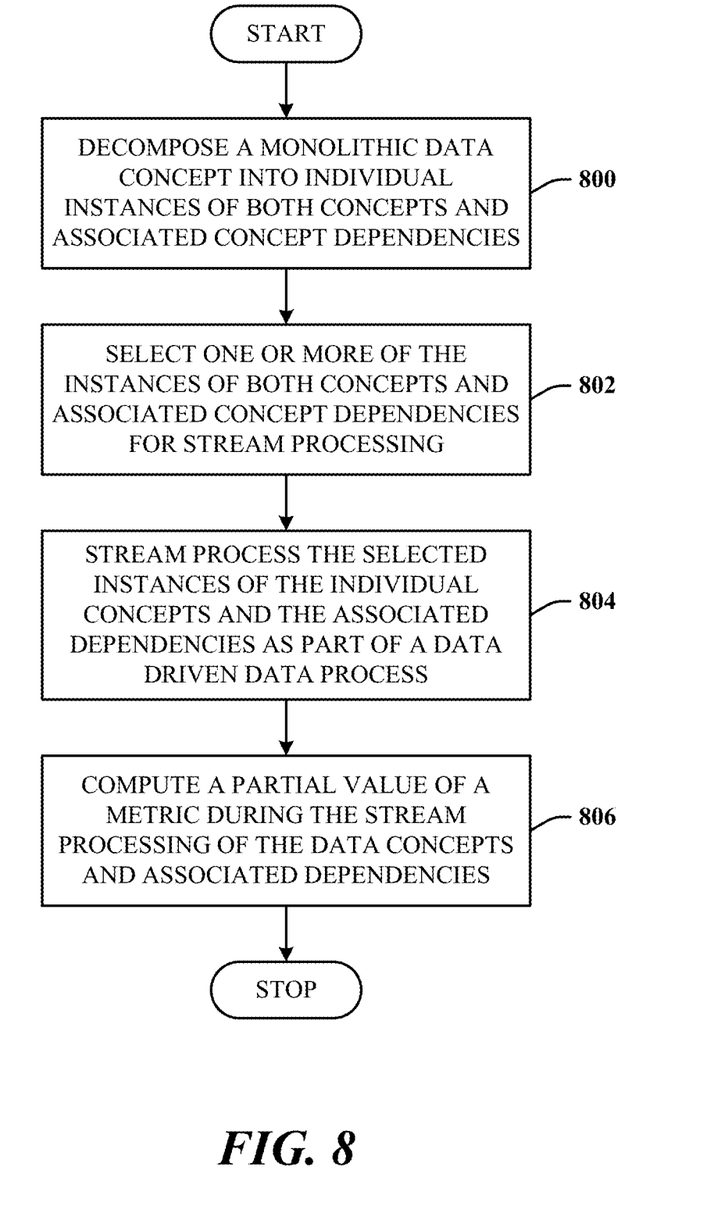
FIG. 8 illustrates an alternative method in accordance with the disclosed architecture.

FIG. 8 illustrates an alternative method in accordance with the disclosed architecture. At 800, a monolithic data concept is decomposed into individual instances of both concepts and associated concept dependencies. At 802, one or more of the instances of both concepts and associated concept dependencies are selected for stream processing. At 804, the selected instances of the individual concepts and the associated dependencies as part of a data driven data process for stream processing. At 806, a partial value of a metric is computed during the stream processing of the data concepts and associated dependencies.

Partial metric computation enables periodic and frequent checks on system performance and data, thereby reducing errors in the desired result data and improving user efficiency.

The method can further comprise computing the partial value of the metric incrementally or non-incrementally. The method can further comprise processing a realtime query against the stream processed selected instances of the individual concepts and the associated dependencies to return a query result of events. The method can further comprise selecting only an instance of a concept and associated dependency based on a data driven requirement.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
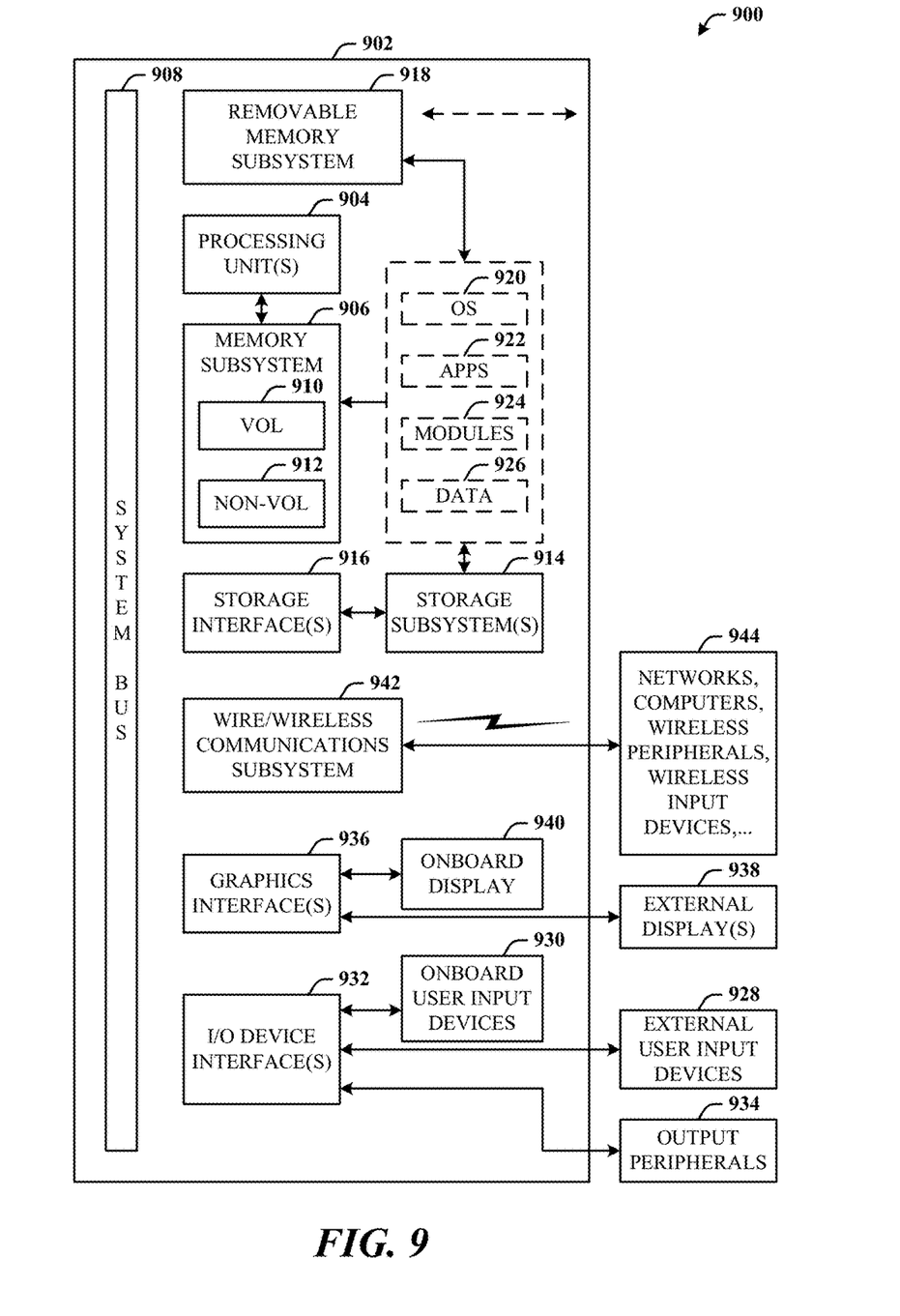
FIG. 9 illustrates a block diagram of a computing system that executes stream processing in search data pipelines in accordance with the disclosed architecture.

Referring now to FIG. 9, there is illustrated a block diagram of a computing system 900 that executes stream processing in search data pipelines in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 900 for implementing various aspects includes the computer 902 having microprocessing unit(s) 904 (also referred to as microprocessor(s) and processor(s)), a computer-readable storage medium (where the medium is any physical device or material on which data can be electronically and/or optically stored and retrieved) such as a system memory 906 (computer readable storage medium/media also include magnetic disks, optical disks, solid state drives, external memory systems, and flash memory drives), and a system bus 908. The microprocessing unit(s) 904 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and a non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the microprocessing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components and circuits. The storage subsystem(s) 914 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include items and components of the system 100 of FIG. 1, items and components of the system 200 of FIG. 2, items and components of the system 300 of FIG. 3, items, components and flow of the system 400 of FIG. 4, items, components and flow of the system 500 of FIG. 5, components and flow of the system 600 of FIG. 6, and the methods represented by the flowcharts of FIGS. 7 and 8, for example.

Generally, programs include routines, methods, data structures, other software components, etc., that perform particular tasks, functions, or implement particular abstract data types. All or portions of the operating system 920, applications 922, modules 924, and/or data 926 can also be cached in memory such as the volatile memory 910 and/or non-volatile memory, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 902, and include volatile and non-volatile internal and/or external media that is removable and/or non-removable. For the computer 902, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 902, programs, and data using onboard user input devices 930 such a touchpad, microphone, keyboard, etc., where the computer 902 is a portable computer, for example.

These and other input devices are connected to the microprocessing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising means for decomposing a monolithic data concept into individual instances of both concepts and associated concept dependencies; means for selecting one or more of the instances of both concepts and associated concept dependencies for stream processing; and, means for stream processing the selected instances of the individual concepts and the associated dependencies on demand.

The system can further comprise means for computing metrics during the stream processing, which metrics represent availability of the data concepts, and storing the metrics in a storage. The system can further comprise means for accessing a value of a subset of the metrics during the stream processing to obtain a latest value of the subset of metrics. The system can further comprise means for interfacing the stream processing to batch processing based on the individual instances of both concepts and associated concept dependencies.

In an alternative implementation, the disclosed architecture can be implemented as a system, comprising means for decomposing a monolithic data concept into individual instances of both concepts and associated concept dependencies; means for selecting one or more of the instances of both concepts and associated concept dependencies for stream processing; means for stream processing the selected instances of the individual concepts and the associated dependencies as part of a data driven data process; and means for computing a partial value of a metric during the stream processing of the data concepts and associated dependencies.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   one or more processing units; and
   one or more memories storing instructions that, when executed by the one or more processing units, cause the system to perform a method comprising:
      separating a monolithic data concept comprised of interdependent data concepts into individual data concepts;
      determining one or more concept dependencies for at least one of the individual data concepts, wherein each concept dependency represents a relationship to another individual data concept;
      selecting one or more individual data concepts and one or more associated concept dependencies for stream processing; and
      stream processing the selected one or more individual data concepts and the one or more associated concept dependencies.

2. The system of claim 1, wherein the stream processing of the selected one or more individual data concepts and the one or more associated concept dependencies comprises at least a part of data driven data processing.

3. The system of claim 1, wherein the one or more individual data concepts and the one or more associated concept dependencies comprise a specific individual data concept and one or more concept dependencies associated with the specific individual data concept, the specific individual data concept selected based on a data driven requirement.

4. The system of claim 1, wherein the method further comprises:
   computing a metric associated with a data concept in the selected one or more data concepts during the stream processing based on availability of the data concept; and
   storing the metric in a storage device.

5. The system of claim 4, wherein the method further comprises updating the metric over time as a new data concept becomes available.

6. The system of claim 4, wherein computing the metric of the data concept during the stream processing comprises computing a partial value of the metric during the stream processing of the data concept and associated one or more concept dependencies.

7. The system of claim 1, wherein the method further comprises accessing a value of a metric during the stream processing, the value comprising a latest value of the metric.

8. The system of claim 1, wherein the method further comprises batch processing a plurality of individual data concepts and one or more associated concept dependencies not included in the selected one or more individual data concepts and the one or more associated concept dependencies.

9. A method, comprising:
   decomposing a monolithic data concept comprised of interdependent data concepts into individual instances of data concepts,
   determining one or more associated concept dependencies for at least one individual instance, wherein each of the one or more associated concept dependencies represents a relationship to another individual instance;
   selecting a subset of the individual instances and at least one associated concept dependency for stream processing; and
   stream processing the selected subset of individual instances and the at least one associated concept dependency on demand.

10. The method of claim 9, wherein the monolithic data concept is decomposed as part of a data driven process.

11. The method of claim 9, wherein the selected subset of the individual instances comprises a specific instance selected based on a data driven requirement.

12. The method of claim 9, further comprising:
   computing one or more metrics for a data concept in at least one of the individual instances in the selected subset of the individual instances during the stream processing; and
   storing the one or more metrics in a storage device.

13. The method of claim 12, further comprising updating at least one of the one or more metrics over time as new data concepts become available.

14. The method of claim 12, further comprising computing a partial value of at least one of the one or more metrics during the stream processing of the selected subset of the individual instances.

15. The method of claim 12, further comprising accessing a value of at least one of the one or more metrics during the stream processing to obtain a latest value of the at least one of the one or more metrics.

16. The method of claim 9, further comprising interfacing the stream processing to batch processing based on the individual instances.

17. A method, comprising:
decomposing a monolithic data concept into individual data concepts;
analyzing an input and an output of each individual data concept to determine one or more concept dependences associated with the individual data concept;
selecting one or more individual data concepts and associated concept dependencies for stream processing; and
stream processing the selected one or more individual data concepts and associated concept dependencies as part of a data driven data process.

18. The method of claim 17, further comprising computing a partial value of a metric during the stream processing of the selected one or more individual data concepts and associated concept dependencies, wherein the partial value of the metric is computed incrementally or non-incrementally.

19. The method of claim 17, further comprising processing a realtime query against the stream processed selected one or more individual data concepts and associated concept dependencies to return a query result of events.

20. The method of claim 17, wherein the selected one or more individual data concepts and associated concept dependencies comprises a specific individual data concept and one or more concept dependencies associated with the specific individual data concept, the specific individual data concept selected based on a data driven requirement.

* * * * *